United States Patent
Marcone et al.

(10) Patent No.: US 12,348,278 B2
(45) Date of Patent: Jul. 1, 2025

(54) UE SELF-CALIBRATION IN COMMUNICATION SYSTEMS

(71) Applicant: Nokia Technologies Oy, Espoo (FI)

(72) Inventors: Alessio Marcone, Munich (DE); Benny Vejlgaard, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 46 days.

(21) Appl. No.: 18/263,447

(22) PCT Filed: Apr. 14, 2022

(86) PCT No.: PCT/EP2022/060134
§ 371 (c)(1),
(2) Date: Jul. 28, 2023

(87) PCT Pub. No.: WO2022/223472
PCT Pub. Date: Oct. 27, 2022

(65) Prior Publication Data
US 2024/0089016 A1  Mar. 14, 2024

(30) Foreign Application Priority Data
Apr. 21, 2021  (FI) ...................................... 20215465

(51) Int. Cl.
*H04B 17/21* (2015.01)
*H04W 72/541* (2023.01)

(52) U.S. Cl.
CPC .......... *H04B 17/21* (2015.01); *H04W 72/541* (2023.01)

(58) Field of Classification Search
CPC ........ H04B 17/21; H04B 17/12; H04B 17/14; H04B 17/13; H04W 72/541

USPC ......................................... 375/224, 346, 348
See application file for complete search history.

(56) References Cited

U.S. PATENT DOCUMENTS

| | | | |
|---|---|---|---|
| 10,056,685 B2 | 8/2018 | Haddad et al. | |
| 10,084,552 B2 | 9/2018 | Dhakal et al. | |
| 10,630,326 B1 | 4/2020 | Gupta et al. | |
| 2018/0069681 A1 | 3/2018 | Chakraborty et al. | |
| 2018/0070363 A1* | 3/2018 | Chakraborty | H04B 17/318 |
| 2018/0097667 A1* | 4/2018 | Yoo | H04B 17/30 |
| 2018/0262995 A1 | 9/2018 | Akkarakaran et al. | |

(Continued)

FOREIGN PATENT DOCUMENTS

| | | |
|---|---|---|
| CN | 111417202 A | 7/2020 |
| EP | 3508006 A1 | 7/2019 |

(Continued)

OTHER PUBLICATIONS

Guan, "FPGA-based Nonlinear Convolution", FPGA-based Digital Convolution for Wireless Applications, 2017, pp. 51-84.

(Continued)

*Primary Examiner* — Emmanuel Bayard
(74) *Attorney, Agent, or Firm* — Robert P. Michal, Esq.; Carter, DeLuca & Farrell LLP

(57) ABSTRACT

The present subject matter relates to an apparatus configured for: receiving a request from a user equipment to transmit calibration signals, allocating a set of resources for the transmission of the calibration signals, sending a message to the user equipment, the message indicating the set of resources, performing interference cancellation for detecting data signals received in accordance with the set of resources.

18 Claims, 5 Drawing Sheets

(56) References Cited

U.S. PATENT DOCUMENTS

| | | | |
|---|---|---|---|
| 2018/0279311 A1* | 9/2018 | Yoo | H04W 8/245 |
| 2020/0029318 A1* | 1/2020 | Guo | H04L 5/0055 |
| 2020/0052753 A1* | 2/2020 | Raghavan | H04B 7/0695 |
| 2020/0076483 A1* | 3/2020 | Zhang | H04L 25/021 |
| 2020/0153517 A1* | 5/2020 | Akkarakaran | H04W 56/0055 |
| 2021/0076370 A1* | 3/2021 | Bengtsson | H04W 72/046 |
| 2021/0135770 A1* | 5/2021 | Schober | H04L 5/0094 |
| 2023/0009653 A1 | 1/2023 | Vejlgaard et al. | |

FOREIGN PATENT DOCUMENTS

| | | |
|---|---|---|
| WO | 2017/014572 A1 | 1/2017 |
| WO | 2018/044810 A1 | 3/2018 |
| WO | 2018/112829 A1 | 6/2018 |
| WO | 2020/041330 A1 | 2/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Physical layer procedures for data (Release 16)", 3GPP TS 38.214, V16.4.0, Dec. 2020, pp. 1-169.

"New WID on NR RF Enhancements for FR2", 3GPP TSG RAN Meeting #89, RP-202107, Agenda: 9.1.2, Nokia, Sep. 14-18, 2020, 5 pages.

"WF on FR2 enhancement part 3: UL gap", 3GPP TSG-RAN WG4#97-e Meeting, R4-2016919, Apple, Nov. 2-13, 2020, pp. 1-6.

"Digital Pre-Distortion (DPD) Concept", Keysight.com, Retrieved on Jul. 20, 2023, Webpage available at : https://rfmw.em.keysight.com/wireless/helpfiles/n7614/Content/Main/Digital%20Pre-Distortion%20(DPD)%20Concept.htm.

"Revised WID Further enhancements of NR RF requirements for frequency range 2 (FR2)", 3GPP TSG RAN meeting #90e, RP-202409, Agenda: 9.8.21, Nokia, Dec. 7-11, 2020, 5 pages.

"3rd Generation Partnership Project; Technical Specification Group Radio Access Network; Study on NR coverage enhancements (Release 17)", 3GPP TR 38.830, V1.0.0, RP-202307, Dec. 2020, 236 pages.

"RAN4#89 Meeting report", 3GPP TSG-RAN WG4 Meeting #90, R4-1900002, Agenda: 3, 3GPP TSG RAN WG4 #89, Feb. 25-Mar. 1, 2019, pp. 1-818.

"On the specification of PCG", TSG-RAN Working Group 4 (Radio) meeting #89, R4-1814723, Agenda: 7.6.13.12, Ericsson, Nov. 12-16, 2018, 1 page.

"On PA calibration gap", 3GPP TSG-RAN WG4 Meeting #88, R4-1809842, Agenda: 7.6.16.11, Intel Corporation, Aug. 20-24, 2018, pp. 1-3.

Shi et al., "An efficient method for enhancing TDD over the air reciprocity calibration", IEEE Wireless Communications and Networking Conference, Mar. 28-31, 2011, pp. 339-344.

Office action received for corresponding Finnish Patent Application No. 20215465, dated Oct. 13, 2021, 7 pages.

International Search Report and Written Opinion received for corresponding Patent Cooperation Treaty Application No. PCT/EP2022/060134, dated Aug. 26, 2022, 15 pages.

"Discussion on RRM impact of UL gaps for self-calibration and monitoring", 3GPP TSG-RAN WG4 Meeting # 98-bis-e, R4-2107078, Agenda: 8.3.7.3, vivo, Apr. 12-20, 2021, 2 pages.

* cited by examiner

UE SELF-CALIBRATION IN COMMUNICATION SYSTEMS

RELATED APPLICATION

This application was originally filed as PCT Application No. PCT/EP2022/060134 on Apr. 14, 2022, which claims priority from Finland Application No. 20215465, filed on Apr. 21, 2021, each of which is incorporated herein by reference in its entirety.

TECHNICAL FIELD

Various example embodiments relate to telecommunication systems, and more particularly to UE self-calibration.

BACKGROUND 5G refers to a new generation of radio systems and network architecture. 5G is expected to provide higher bitrates and coverage than the current long term evolution (LTE) systems. Performance of components such as power amplifiers may affect the overall performance and throughput of such communication systems, as they may inherently be nonlinear. The nonlinearity may generate spectral regrowth, which may lead to adjacent channel interference and violations of the out-of-band emissions standards. It may also cause in-band distortion, which may degrade the error vector magnitude and ultimately the bit-error rate (BER) and data throughput of the communication system.

SUMMARY

Example embodiments provide an apparatus comprising means being configured for: receiving a first request message from a user equipment, the first request message indicating that the user equipment may transmit calibration signals, in response to receiving the first request message, configuring a set of resources for the transmission of the calibration signals, sending a first response message to the user equipment, the first response message indicating the set of resources, receiving a second request message from the user equipment to activate the set of resources, in response to receiving the second request message, sending a second response message indicating activation of the set of resources, receiving the calibration signals from the user equipment, performing a cancellation of an interference caused by the calibration signals for detecting data signals received in accordance with the set of resources.

The means of the apparatus comprises, for example, at least one processor, and at least one memory including computer program code, the at least one memory and the computer program code being configured to, with the at least one processor, cause the performance of the apparatus.

Example embodiments provide a method comprising: receiving a first request message from a user equipment, the first request message indicating that the user equipment may transmit calibration signals, in response to receiving the first request message, configuring a set of resources for the transmission of the calibration signals, sending a first response message to the user equipment, the first response message indicating the set of resources, receiving a second request message from the user equipment to activate the set of resources, in response to receiving the second request message, sending a second response message indicating activation of the set of resources, receiving the calibration signals from the user equipment, performing a cancellation of an interference caused by the calibration signals for detecting data signals received in accordance with the set of resources.

Example embodiments provide a computer program comprising instructions for causing an apparatus for performing at least the following: receiving a first request message from a user equipment, the first request message indicating that the user equipment may transmit calibration signals, in response to receiving the first request message, configuring a set of resources for the transmission of the calibration signals, sending a first response message to the user equipment, the first response message indicating the set of resources, receiving a second request message from the user equipment to activate the set of resources, in response to receiving the second request message, sending a second response message indicating activation of the set of resources, receiving the calibration signals from the user equipment, performing a cancellation of an interference caused by the calibration signals for detecting data signals received in accordance with the set of resources.

Example embodiments provide a user equipment comprising means being configured for: sending to an apparatus a first request message, the first request message indicating that the user equipment may transmit calibration signals; receiving from the apparatus a first response message, the first response message indicating a set of resources for transmission of the calibration signals; sending to the apparatus a second request message to activate the set of resources; receiving from the apparatus a second response message indicating activation of the set of resources; sending to the apparatus the calibration signals.

The means of the user equipment comprises, for example, at least one processor, and at least one memory including computer program code, the at least one memory and the computer program code being configured to, with the at least one processor, cause the performance of the user equipment.

Example embodiments provide a method comprising: sending to an apparatus a first request message, the first request message indicating that a user equipment may transmit calibration signals; receiving from the apparatus a first response message, the first response message indicating a set of resources for transmission of the calibration signals; sending to the apparatus a second request message to activate the set of resources; receiving from the apparatus a second response message indicating activation of the set of resources; sending to the apparatus the calibration signals.

Example embodiments provide a computer program comprising instructions for causing a user equipment for performing at least the following: sending to an apparatus a first request message, the first request message indicating that the user equipment may transmit calibration signals; receiving from the apparatus a first response message, the first response message indicating a set of resources for transmission of the calibration signals; sending to the apparatus a second request message to activate the set of resources; receiving from the apparatus a second response message indicating activation of the set of resources; sending to the apparatus the calibration signals.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
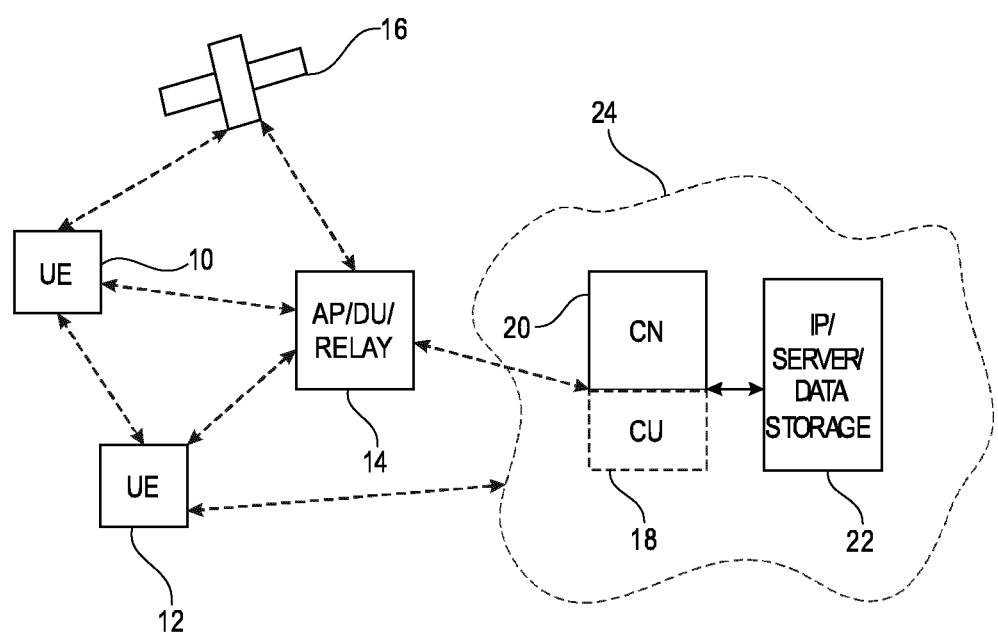
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

A communication system may be provided. The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties. The communication system comprises one or more base stations. The base station may serve user equipments located within the base station's geographical area of service or cell. The base station may, for example, be a multi-beam transmission system. Time-frequency resources of the communication system may be used for carrying information. The resources may be termed physical channels. The physical channels may be specified for uplink (UL) and downlink (DL) transmission of data. The physical channels may, for example, comprise a physical uplink shared channel (PUSCH), physical downlink control channel (PDCCH), physical random access channel (PRACH) etc.

The apparatus as described herein may, for example, be a base station of the communication system. The base station may be configured to schedule user equipments in time and frequency. The base station may, for example, decide which user equipments are served and how many resource blocks are assigned to each selected user equipment. The user equipment may transmit data according to the scheduled resources. The user equipment may be configured to exchange data with the base station depending on its connection status. A user equipment that may be served by the base station may have a connection status indicative of a state of connection of the user equipment to the base station. The state of the connection may, for example, be an idle state or connected state. The user equipment being in a connected state means that the user equipment is connected to the base station and can exchange data with the base station. The user equipment being in an idle state means that the user equipment is not connected to the base station. The idle state may, for example, be a radio resource control (RRC) IDLE state (RRC-IDLE). The connected state may, for example, be an RRC-CONNECTED state.

Given the complexity of the communication systems and the impairments associated with the physical hardware in the user equipments, the user equipments may have to calibrate and linearize themselves during operation. The calibration may be performed to ensure that one or more components of the user equipment function as expected. For example, the calibration may be a calibration of a power amplifier efficiency and power consumption, transceiver calibration due to temperature variation, UE Tx power management etc. For example, a power amplifier (PA) of the user equipment may have a non-linear response which is not desired since it may create broadening of the transmitted signal spectrum. For that, a predistortion may be used to compensate for such a non-linearity, wherein a signal is pre-distorted before power amplification in such a way that after amplification the resulting signal approximates an ideal signal linearity. Since the predistortion may depend on characteristics of the power amplifier, and those characteristics may change over time, there may be need to monitor the behavior of the characteristics of the power amplifier and adapt accordingly the predistortion. In order to determine the power amplifier characteristics, a calibration of the power amplifier may be performed.

However, during their operation, the calibration of the user equipments may be constrained by the default settings used for data transmission. For example, to ensure a power efficient connectivity, and improve service quality, a transmit power control procedure which enables power control for the uplink transmissions may be enabled at the user equipment during its operation. The transmit power control procedure may provide a precise control mechanism for the uplink transmission power and ensure that the user equipments do not generate excessive interference to the network by exceeding permitted levels. For example, the user equipment may operate in a default mode of operation. In the default mode of operation, the user equipment may transmit data according to power control settings of the transmit power control procedure. However, the transmit power control procedure may limit the user equipment's calibration capability. For example, when doing the power amplifier calibration within granted resources, and since the user equipment is supposed to follow the power control procedure, this behavior may be suboptimal since, in most cases, it does not allow to drive the power amplifier to its non-linear region and does not permit a proper characterization of the power amplifier response.

Hence, the user equipment and the base station according to the present subject matter may be configured to perform steps of a resource allocation method in order to provide resources for transmitting calibration signals. The user equipment may use the resources provided by the resource allocation method to send calibration requests.

In one first example, the user equipment according to the present subject matter may be configured to send a request to transmit calibration signals to the base station. The request may be named calibration request. The calibration request may, for example, further comprise capability information of the user equipment. This may be advantageous in case the base station did not receive yet the capability information e.g., through an initial registration procedure. In response to the sending of the calibration request, the user equipment may receive from the base station a message (named grant message) indicating a set of resources. The transmission and reception of the grant message and the calibration request may be the steps of the resource allocation method of the first example. The set of resources may, for example, be non-reserved resources e.g., the set of resources are not exclusively reserved for calibration signals. This may be advantageous because including dedicated time and frequency resources reserved for self-calibration and monitoring only, the base station may not assign those resources to other user equipments for UL transmission. The user equipment may then transmit the calibration signals according to the set of resources indicated in the grant message. The user equipment may transmit the calibration signals to the base station. The calibration signal may be a self-calibrating signal. The transmission of calibration signals may enable the user equipment to perform the calibration of one or more components of the user equipment. The calibration may, for example, be self-calibration. The user equipment may, thus be referred to as a self-calibrating user equipment.

The term "message" may refer to information transmitted as information in a prescribed format, where the message may be in the form a series of bits having the prescribed format.

The calibration request may be provided as a special message for the UE to ask the base station to configure UL resources so that the UE can transmit the calibration signals. The user equipment may, for example, utilize a configured UL control channel (PUCCH) to send the calibration request. For that, a new PUCCH format may be defined or a UCI content of an existing PUCCH format may be extended so that the calibration request may be integrated into the PUCCH structure. In another example, the user equipment may utilize the UL shared channel (PUSCH) to send the calibration request. The user equipment may integrate the calibration request in the PUSCH structure.

The set of resources may be ad-hoc resources dedicated for self-calibration. The set of resources may be UE specific uplink gaps in which the calibration signals may be transmitted with high bandwidth (e.g., full bandwidth—400 MHz) and high TX power. However, this behavior may cause large interference to a receiver of the base station, depending on network behavior.

Hence, the base station according to the present subject matter may be configured to receive the calibration request from the user equipment. In response to receiving the calibration request the base station may allocate the set of resources for the transmission of the calibration signals and send the grant message indicating the set of resources to the user equipment. The base station may perform an interference cancellation for detecting or decoding data signals received in accordance with the set of resources.

The present subject matter may enable to perform calibration during operation of the user equipment. The present subject matter may minimize the system impact caused by UE self-calibrations. In particular, the information exchange (according to the resource allocation method) between the user equipment and the base station may enable more flexibility in the UL self-calibration periodicity and concurrently a method for the base station to cope with the interference caused by the self-calibrating user equipment. In particular, the allocated UE specific UL gaps and their periodicity may be used for enhancing UL performance. Since the base station may not reserve UL resources for the self-calibration, reception of other UEs transmissions in the same time intervals may be strongly impaired. The procedure according to the present subject matter may enable a full flexibility for UE self-calibration while alleviating the interference problem associated with it.

In one second example, the resource allocation method may be implemented such that the set of resources are first configured and subsequently activated. The configuration and activation may occur separately so as to decrease gaps overhead as much as possible e.g., the base station may allocate the gaps strictly when needed by the UE, after UE request. For that, the base station may receive a first request message from the user equipment, wherein the first request message indicates a capability of the user equipment or a need to transmit calibration signals. In response to the first request message, the set of resources may be configured by the base station. The base station may send a first response message to the user equipment. The first response message indicates that the set of resources are configured. The base station may receive a second request message from the user equipment to activate the set of resources. In response to the second request message, the base station may activate the set of resources and send a second response message indicating activation of the set of resources. In this second example, the transmission/reception steps of the first and second request messages and corresponding first and second response messages are the steps of the resource allocation method.

The difference between the first example and the second example may lie in the way the resource allocation method is performed. However, regardless of how the resource allocation method is performed, the present subject matter may have the advantage of calibrating the user equipment without or with reduced impact on the ongoing operation of the communication system.

The second request message may be provided as a special Physical Layer message for the UE to ask the base station to activate the UL resources so that UE can transmit the calibration signals. The user equipment may, for example, utilize a configured UL control channel (PUCCH) to send the second request message. For that, a new PUCCH format may be defined or a UCI content of an existing PUCCH format may be extended so that the second request message may be integrated into the PUCCH structure. In another example, the user equipment may utilize the UL shared channel (PUSCH) to send the second request message. The user equipment may integrate the second request message in the PUSCH structure.

The present subject matter may further improve the self-calibration at the user equipment by improving the resource allocation method. In one example, the user equipment may autonomously perform the calibration request or the second request message of UL resources for self-calibration based on internal evaluations. Autonomously requesting the resources means that the request is not triggered by the base station that serves the user equipment. For example, the user equipment may autonomously send the calibration request or the second request message. The user equipment may be able to detect when calibration is necessary based on internal evaluations, and may request activation of UL resources for that purpose.

The present subject matter may further be advantageous as it may seamlessly be integrated with existing systems. In one example, the allocated set of resources may be resources assigned for transmission of Sounding Reference Signals (SRS). The calibration signals may, for example, be sent as SRSs. For example, the allocation of the set of resources may be performed by the base station by configuring and activating specific resources for UL SRS transmission. The base station may, for example, react to the calibration request or to the second request message by sending the message as part of a downlink control information (DCI) or as part of a radio resource control (RRC) message indicating the UL SRS activation.

In an example, in order to configure the user equipment with the new usage of the SRS resources, the parameter usage associated with the specific SRS resources may be set to the value "self-calibration". This may implicitly trigger UE transmitter self-calibration and base station receiver interference cancellation. The set of resources may be configured to provide efficient self-calibration e.g., the set of resources may last one or more OFDM symbols and occupy a transmission bandwidth higher than a minimum bandwidth. The minimum bandwidth and the minimum number of OFDM symbols may be sent by the user equipment as part of the calibration request or as part of the first request message.

The present subject matter may further be advantageous as it may improve the transmission of the calibration signals by the user equipment and their reception by the base station. In one example, the user equipment may be configured to ignore the transmit power control procedure and transmit the calibration signals at a desired power. For example, upon receiving the grant message or the second response message from the base station, the user equipment may switch from the default mode of operation to a calibration mode of operation. In the calibration mode of operation, the user equipment may be allowed to discard the power control settings and transmit at full power the calibration signals. On the other side, the base station may be configured to perform interference cancelation for detecting data signals received in accordance with the set of resources. The interference may be a co-channel interference. The interference may occur between the calibration signals and data signals received at the base station on the same resources. The data signals may be received from difference sources. In one example, the data signals may be received from another user equipment that is scheduled by the base station on resources that comprise at least part of the set of resources of the self-calibrating user equipment. The scheduling of the other user equipment may be concurrently performed with the allocation of the set of resources for the self-calibrating user equipment. This may enable the base station to receive and read data signals of the other user equipment (named UE2) while still enabling the self-calibration by the self-calibrating user equipment (UE1).

The present subject matter may further improve the interference cancelation by using beams. For example, the base station may comprise a multi-antenna system. The multi-antenna system may comprise one or more arrays of antenna elements. The array may be a collection of multiple antenna elements arranged in a matrix of rows and columns or some other pattern. The multi-antenna system may be used to perform the beamforming. The beamforming may be a signal processing technique that may be used at the base station to add together radiation patterns of each of the antenna elements in an array in such a way that they concentrate the energy into a narrow beam or lobe. Beamforming may be achieved by combining the signals communicated via antenna elements of an antenna array such that some of the signals experience constructive interference while others experience destructive interference. To create the desired constructive/destructive interference, the base station may apply amplitude and/or phase offsets to signals transmitted from each of the antenna elements of the antenna array. The base station may thus be configured according to the present subject matter to use the beamforming technique to generate a set of one or more beams for the reception of the data in the set of beams. For example, for reception of UL transmissions, the base station may steer its receive beam towards the other user equipment UE2, so as to maximize the link budget towards the UE2 transmitting UL data and concurrently attenuate (through secondary lobes rejection) the power received from UE1.

In an example implementation, the procedure for interference cancellation may be performed as follows. The base station may receive calibration signals from the user equipment UE1 and the data signals from the other user equipment UE2, thereby receiving an overall baseband signal in one subcarrier $y=H_1x_1+H_2x_2+n$, where $x_1$ and $x_2$ are frequency domain transmitted signals of the calibration and data signals respectively, $H_1$ is a channel frequency response in one subcarrier of a link between the base station and the user equipment UE1 and $H_2$ is a channel frequency response in one subcarrier of a link between the base station and the other user equipment UE2. n includes the impairments on the one subcarrier due to receiver noise and interference. The base station may estimate the channel frequency response $H_1$ from the overall baseband signal by considering $H_2x_2$ as an additional noise and by using a knowledge of the frequency domain transmitted signal $x_1$. The base station may reconstruct a noiseless received signal defined by $H_1x_1$. The base station may subtract the noiseless signal from the overall baseband signal y to retrieve a signal z: $z=H_2x_2+n$. The base station may decode the signal z to retrieve the frequency domain transmitted signal $x_2$.

In response to transmitting the calibration signals, the user equipment may receive and analyze a feedback signal from the output of the power amplifier. The user equipment may compare the feedback signal with the signal at the input of the power amplifier. The differences between the feedback signal and the signal at the input of the power amplifier may be used by the user equipment in order to compute the amount of pre-distortion required for different amplitudes and frequencies to linearize or substantially linearize the power amplifier response.

FIG. 1 depicts example of simplified system architecture showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 10 and 12. The devices 10 and 12 may, for example, be user devices. The devices 10 and 12 are configured to be in a wireless connection on one or more communication channels with a node 14. The node 14 is further connected to a core network 20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, but not limited in application, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
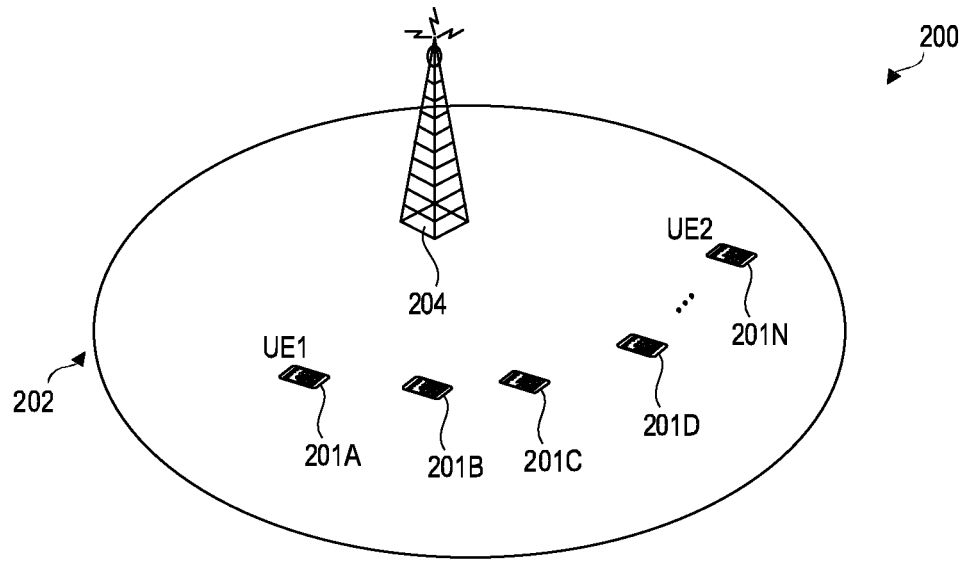
FIG. 2 is a schematic illustration of a communication system.

FIG. 2 is a schematic illustration of a wireless communication system 200. The communication system 200 may, for example, be configured to use a time division duplex (TDD) technique for data transmission.

For simplicity, communication system 200 is shown to include a single base station 204 but it is not limited to. The base station 204 may, for example, be eNodeB or gNB e.g., as described with reference to FIG. 1. The base station 204 may serve UEs 201A through 201N within a respective geographical coverage area of service or cell 202.

The base station 204 may communicate over a transmission medium with the UEs 201A through 201N. The base station 204 may be a base transceiver station (BTS), and may include hardware that enables wireless communication with the UEs 201A through 201N. The base station 204 may facilitate communication between the UEs and/or between the UEs and a network e.g., a core network of a cellular service provider.

The base station 204 may have a fixed number of time and frequency resources e.g., for uplink and/or downlink communication. For example, the base station 204 may have a fixed number of physical resource blocks (PRBs) defined in time and frequency for the uplink communication.

Each UE of the UEs 201A through 201N may be configured to communicate using multiple wireless communication standards. For example, the UE might be configured to communicate using a 3GPP cellular communication standard, WLAN, Bluetooth, one or more global navigational satellite systems (GNSS, e.g., GPS or GLONASS), one and/or more mobile television broadcasting standards (e.g., ATSC-M/H or DVB-H), etc.

In this particular example, the user equipment 201A named UE1 may be configured to perform self-calibration and the user equipment 201N named UE2 may be in a state such as connected state and being ready for receiving scheduled resources by the base station 204.

Figure 3:
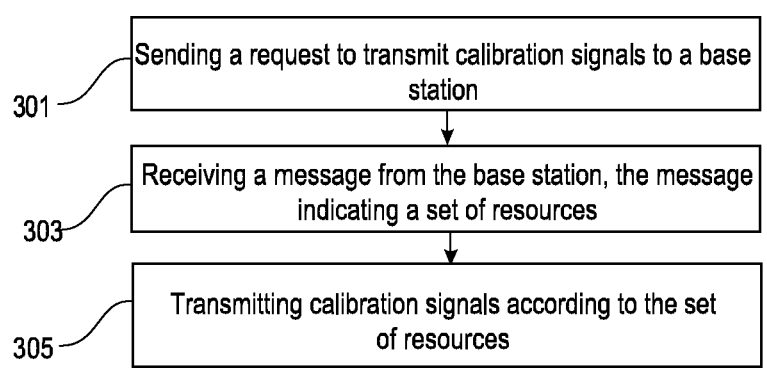
FIG. 3 is a flowchart of a method used in a user equipment (UE) according to an example of the present subject matter.

FIG. 3 is a flowchart of a method used in a user equipment, e.g., UE1, according to an example of the present subject matter. For the purpose of explanation, the method may be implemented in the system illustrated in previous FIGS. 1-2, but is not limited to this implementation.

The user equipment UE1 may send in step 301 a request of resources to transmit calibration signals to a base station e.g., base station 204. The request may, for example, be sent in an uplink control channel such as PUCCH or in an uplink shared channel such as PUSCH or in a physical random access channel as PRACH or in a radio resource control (RRC) UL message. The request may, for example, be for requesting that a calibration is to be performed at the user equipment UE1. The request may, for example, further comprise capability information indicating the capability of the user equipment UE1. In response to sending the request, the user equipment UE1 may receive in step 303 a grant message from the base station 204. The received grant message indicates either a set of resources or activation of a previously configured set of resources for UE1. The grant message may, for example, be received in a downlink control channel such as PDCCH or in a downlink shared channel PDSCH or in a radio resource control (RRC) DL message. The set of resources may be time and frequency resources. The set of resources may not only be dedicated or reserved for self-calibration and monitoring, as other user equipments may use part or all of those resources for UL transmission. The set of resources may enable a transmission of the calibration signals. The user equipment UE1 may use the set of resources to transmit in step 305 calibration signals to the base station 204. For example, step 305 may be performed by transmitting a calibration signal covering the bandwidth of interest every second subframe or every $N^{th}$ frame.

Figure 4:
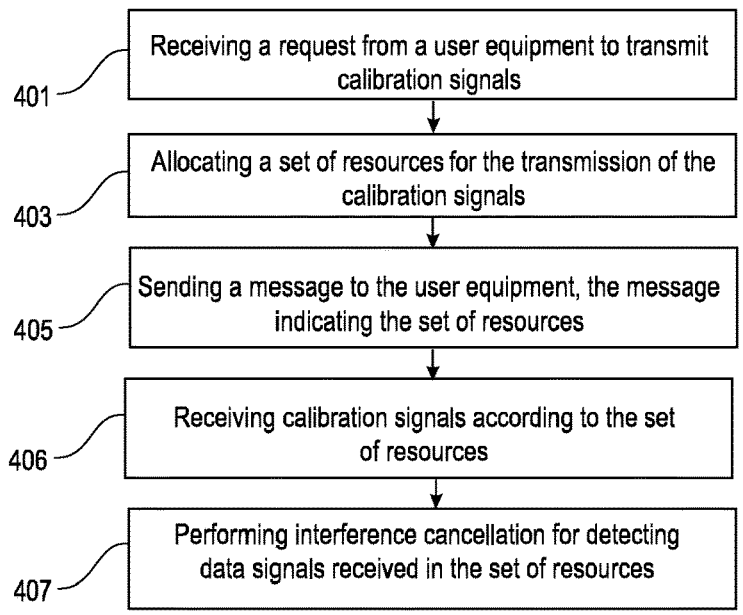
FIG. 4 is a flowchart of a method used in a base station according to an example of the present subject matter.

FIG. 4 is a flowchart of a method used in a base station according to an example of the present subject matter. For the purpose of explanation, the method may be implemented in the system illustrated in previous FIGS. 1-2 and the method of FIG. 3, but is not limited to this implementation.

The base station 204 may receive in step 401 the request of resources from the user equipment UE1 to transmit calibration signals. The calibration request may, for example, further comprise capability information of the user equipment. This may be advantageous in case the base station did not receive yet the capability information e.g., through an initial registration procedure.

The base station 204 may allocate in step 403 a set of resources for the transmission of the calibration signals. The base station 204 may send in step 405 the grant message to the user equipment UE1, the grant message indicating the set of resources. The base station may further schedule another user equipment UE2 in at least part of the set of resources.

The base station may receive in step 406 the calibration signals from the user equipment UE1. The base station 204 may further receive data signals from the other user equipment UE2 in the same set of resources.

The base station may perform in step 407 interference cancellation in order to detect or decode the data signals received in accordance with the allocated set of resources. For example, the user equipment UE1 may be granted specific SRS resources for transmitter PA self-calibration in slot n. The base station may schedule the second user equipment UE2 in the slot n, occupying part or all of the time and frequency resources used by UE1, and applies an interference cancellation procedure for decoding the data transmitted by the second user equipment UE2. This way the system impact in terms of throughput reduction and large interference may be minimized.

Figure 5:
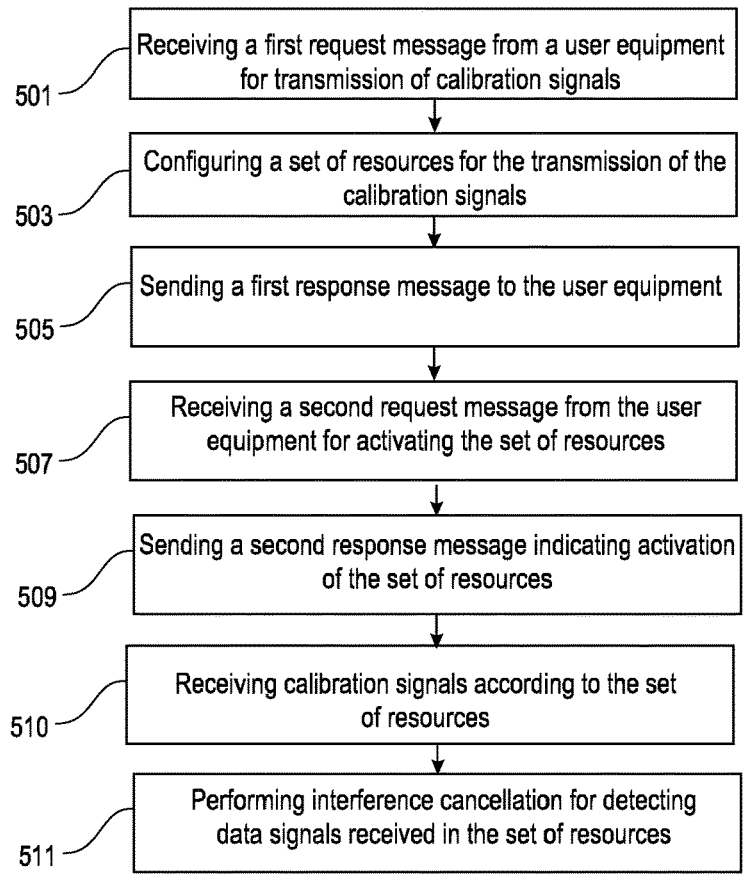
FIG. 5 is a flowchart of a method used in a base station according to an example of the present subject matter.

FIG. 5 is a flowchart of a method according to an example of the present subject matter. For the purpose of explanation, the method may be implemented in the system illustrated in previous FIGS. 1-2, but is not limited to this implementation. The method of FIG. 5 may, for example, be performed by the base station 204.

A first request message may be received in step 501 from a user equipment UE1. The first request message indicates a request to transmit calibration signals. The first request message is a message. The first request message may, for example, be a RRC message comprising capability information of the user equipment UE1. The reception of the capability information in the RRC message may be an indication for the base station that the user equipment UE1 may need resources for transmitting calibration signals. In another example, the first request message may be received during a random access procedure in the PRACH. For example, the user equipment UE1 may send a specific PRACH preamble indicating that the user equipment UE1 may support or need a dynamic self-calibration. Based on the PRACH preamble, the base station 204 may configure the set of resources for the user equipment UE1. The first request message may further indicate a minimum bandwidth and minimum number of OFDM symbols that should be comprised in the resources the UE1 needs for transmitting calibration signals.

In response to receiving the first request message, the base station 204 may configure in step 503 a set of resources for the transmission of the calibration signals by the user equipment UE1. The set of resources may, for example, be defined by the base station 204 according to the received minimum bandwidth and minimum number of OFDM symbols. The set of resources may comprise a transmission duration higher than the minimum number of OFDM symbols, and a transmission bandwidth higher than the minimum bandwidth. Moreover, the base station 204 may configure other resources e.g., PUCCH resources for the UE1 to send a second request for activating the set of resources e.g., as described in step 507.

The base station 204 may send in step 505 a first response message to the user equipment UE1. The first response message is a message. The first response message indicates the configured set of resources. The first response message may further indicate the other configured resources for the transmission of the activation request message.

The base station 204 may receive in step 507 a second request message from the user equipment UE1 to activate the set of resources. The second request message is a message. The second request message may be received in PUCCH or PUSCH.

In response to receiving the second request message, the base station 204 may activate the set of resources and send in step 509 to the user equipment UE1 a second response message indicating activation of the set of resources. The second response message is a message. This method may thus enable the base station 204 to configure the set of resources and subsequently activate the set of resources for the transmission of the calibration signals. The user equipment UE1 may start using the set of resources after their activation by the base station 204. This resource configuration followed by activation may be advantageous as the base station 204 may deactivate/activate the usage of the set of resources as it is desired. The base station 204 may further schedule another user equipment UE2 in at least part of the set of resources.

The base station 204 may receive in step 510 the calibration signals from the user equipment UE1. The base station 204 may further receive data signals from the other user equipment UE2 in the same set of resources.

The base station 204 may perform in step 511 a cancellation of an interference caused by the calibration signals for detecting or decoding the data signals received in accordance with the set of resources from the other user equipment UE2.

Figure 6:
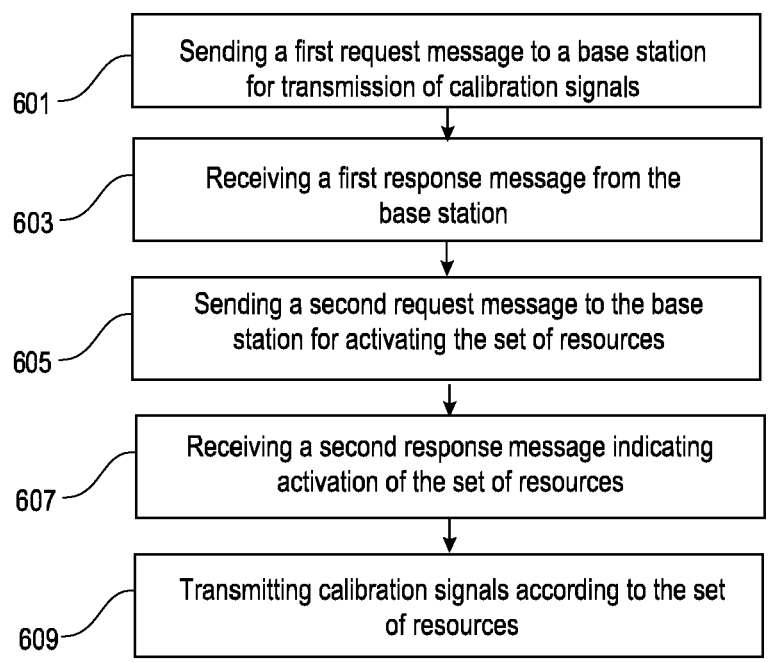
FIG. 6 is a flowchart of a method used in a user equipment according to an example of the present subject matter.

FIG. 6 is a flowchart of a method according to an example of the present subject matter. For the purpose of explanation, the method may be implemented in the system illustrated in previous FIGS. 1-2, but is not limited to this implementation. The method of FIG. 6 may, for example, be performed by the user equipment UE1.

The user equipment UE1 may send in step 601 to the base station 204 a first request message to configure resources to transmit calibration signals. The first request message may, for example, be a RRC message comprising capability information of the user equipment UE1. The reception of the capability information in the RRC message may be an indication for the base station that the user equipment UE1 may need resources for transmitting calibration signals. In another example, the first request message may be sent during a random access procedure in the PRACH. For example, the user equipment UE1 may send a specific PRACH preamble indicating that the user equipment UE1 may support or need a dynamic self-calibration. Based on the PRACH preamble, the base station 204 may configure the set of resources for the user equipment UE1.

In response to sending the first request message, the user equipment UE1 may receive in step 603 from the base station 204 a first response message. The first response message indicates that a set of resources are configured for the UE1 to transmit the calibration signals. The first response message may further indicate other configured resources for submitting an activation request for activating the configured set of resources.

Upon determining that a calibration of the user equipment UE1 is to be performed, the user equipment UE1 may send autonomously in step 605 to the base station 204 a second request message to activate the configured set of resources in order to transmit calibration signals to the base station 204. The second request message may be sent according to the other configured resources. The second request message may, for example, be integrated into the PUCCH structure by adding one bit in the UCI payload. In addition, the other resources configured for the second request message may further indicate a periodicity of the transmission of the second request message and maximum number of times for transmitting the second request message. For example, after transmitting for the first time the second request message on PUCCH, if the user equipment UE1 does not receive a response from the base station then based on the periodicity, the UE1 may re-send the second request message on PUCCH. If the maximum number of transmissions is achieved without receiving a response, the UE1 may initiate a random access procedure.

In response to sending the second request message, the user equipment UE1 may receive in step 607 from the base station 204 a second response message. The second response message indicates that the set of resources are activated. The set of resources may not be reserved resources; that is, the set of resources may not exclusively be used by the user equipment UE1.

The user equipment UE1 may transmit in step 609 calibration signals to the base station 204 according to the set of resources. For example, the user equipment UE1 may switch into the calibration mode of operation in response to receiving the second response message. In the calibration mode of operation, the user equipment UE1 may ignore default power control settings of the default mode of operation in order to transmit the calibration signals at a power equal to or higher than a power determined by the default power control settings. This may be advantageous, as in case the user equipment UE1 is already at max power with default power control, it can still be used.

Using the transmitted calibration signals, the user equipment UE1 may be able to perform the calibration. For example, the user equipment UE1 may receive and analyze a feedback signal from the output of the power amplifier in response to the transmitted calibration signals. The user equipment may compare the feedback signal with the signal at the input of the power amplifier. The differences between the feedback signal and the signal at the input of the power amplifier may be used by the user equipment UE1 in order to compute the amount of pre-distortion required for different amplitudes and frequencies to linearize or substantially linearize the power amplifier response.

Figure 7:
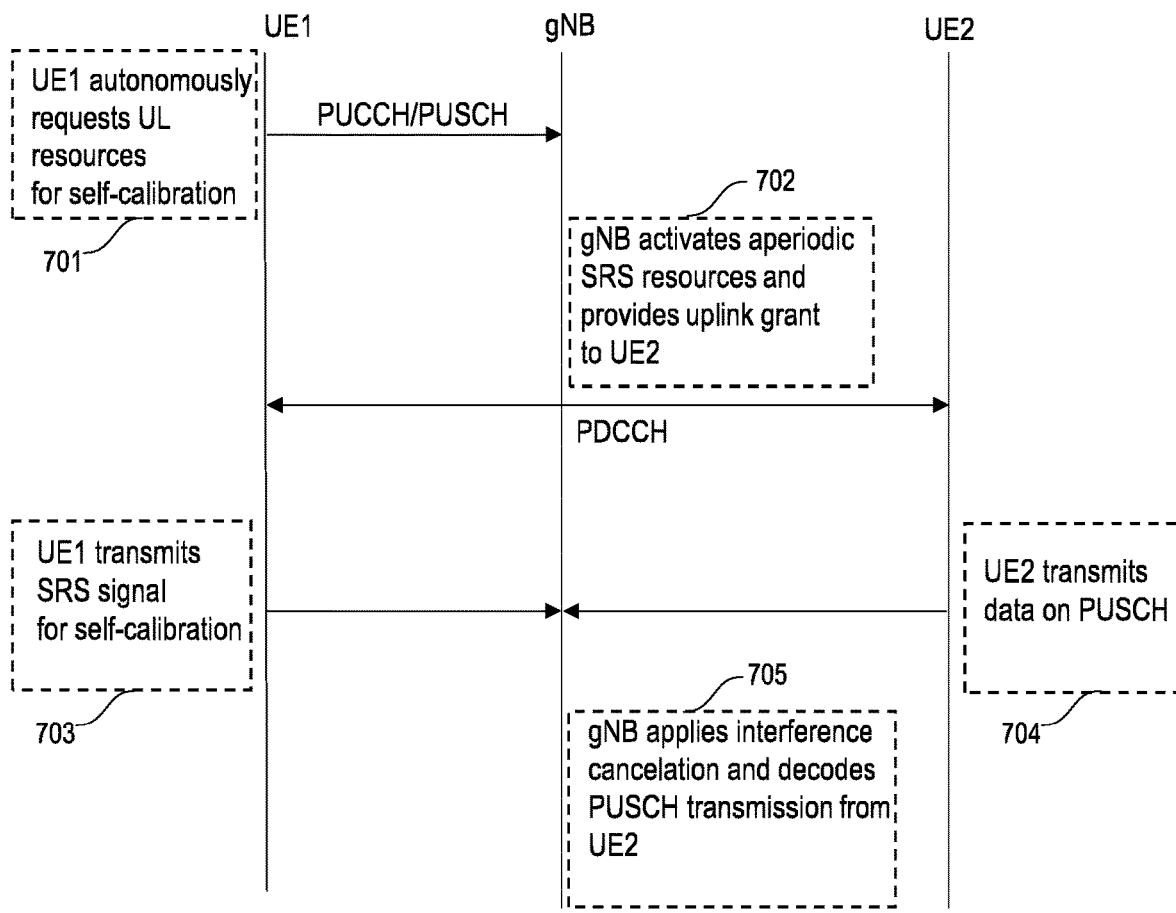
FIG. 7 is a flow diagram of a signaling method between a base station and a user equipment for calibration of the user equipment in accordance with an example of the present subject matter.

FIG. 7 is a flow diagram of a signaling method between a base station and user equipments UE1 and UE2 for calibration of the user equipment UE1 in accordance with an example of the present subject matter. The base station 204 may, for example, be a gNB as described with reference to FIG. 1. The user equipment UE1 may be in a connected state e.g., RRC-CONNECTED. In addition, the gNB 204 may have configured for the user equipment UE1 a set of resources such that the user equipment UE1 can transmit calibration signals in the set of resources.

In step 701, the user equipment UE1 is in RRC connected state and may autonomously request activation of configured UL resources for self-calibration based on internal evaluations. The user equipment UE1 may utilize the UL control channel (PUCCH) to request ad-hoc resources for self-calibration. This request may be integrated into the PUCCH structure by adding one bit in the UCI payload. Without loss of generality, the user equipment UE1 may integrate such request also in the UL shared channel PUSCH.

In step 702, the gNB may react to the request by activating specific resources (through DCI format 0_1 or 1_1) for aperiodic UL SRS transmission. These SRS resources may be configured to provide efficient self-calibration. The SRS resources may last one or more OFDM symbols and occupy a large transmission bandwidth. In addition, these SRS resources may be configured with the parameter usage set to "self-calibration" that implicitly triggers the UE transmitter self-calibration and gNB receiver interference cancellation. Finally, the user equipment UE1 may be allowed to discard power control settings when configured for self-calibration and transmit at full power. Concurrently, the gNB may schedule another user equipment UE2 in the same slot/symbols as the self-calibrating user equipment UE1.

In step 703, the user equipment UE1 may transmit SRS signals for self-calibration and UE2 may transmit in step 704 data on PUSCH to the same gNB. For reception of such UL transmissions, the gNB may steer its receive beam towards the user equipment UE2, so as to maximize the link budget towards the user equipment UE2 transmitting UL data and concurrently attenuate (through secondary lobes rejection) the power received by the user equipment UE1.

The gNB may receive the two UL transmissions from UE1 and UE2 and perform in step 705 interference cancellation to aid decoding of PUSCH transmissions from the user equipment UE2. This process may be advantageous as the self-calibration signal may be transmitted at full power, and could impair reception of UE2 PUSCH.

In an example implementation, the procedure for interference cancellation may follow the following steps:

1. The gNB may receive the overall baseband signal y on one subcarrier:

$$y = H_1 x_1 + H_2 x_2 + n,$$

where $x_1$ and $x_2$ are the frequency domain transmitted signals on the one subcarrier from UE1 and UE2, respectively. In particular $x_1$ is a self-calibrating SRS signal whereas $x_2$ is a data signal (PUSCH). In addition, $H_1$ and $H_2$ are the channel frequency responses on the one subcarrier of the link gNB-UE1 and gNB-UE2, respectively. n includes the impairments on the one subcarrier due to receiver noise and interference.

2. The gNB may estimate $H_1$ from y by considering $H_2 x_2$ as an additional noise and by using a knowledge of $x_1$. This step may basically be the same as performing channel estimation through SRS signal.
3. The gNB may reconstruct the noiseless received signal from UE1 as follows: $H_1 x_1$.
4. The gNB may subtract the noiseless signal from the received signal y to retrieve z as follows:

$$z = H_2 x_2 + n$$

The method may provide only slight increase of the variance of n, in particular in good SNR conditions.

5. The gNB may decode z in the usual way as for a PUSCH communication to retrieve the data $x_2$ sent by UE2.

Even if this procedure is illustrated for a particular subcarrier, a generalization to the whole transmission bandwidth is generally possible.

Figure 8:
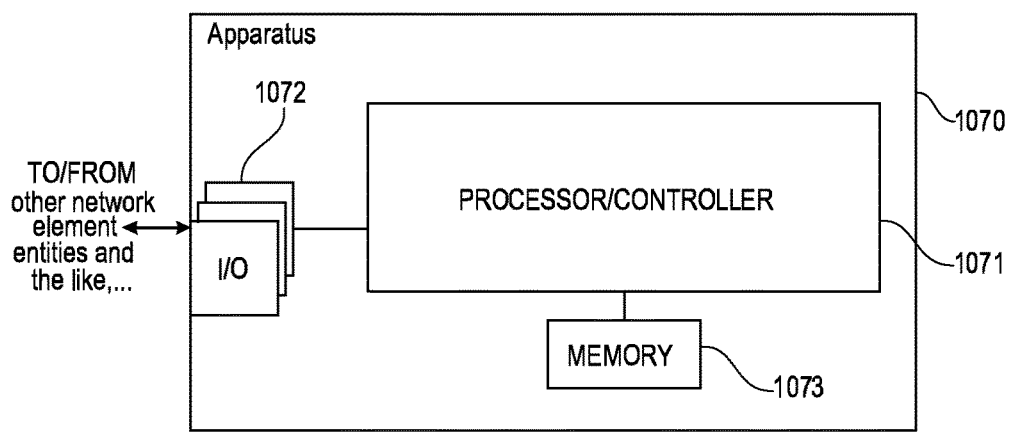
FIG. 8 is a block diagram showing an example of an apparatus according to an example of the present subject matter.

In FIG. 8, a block circuit diagram illustrating a configuration of an apparatus 1070 is shown, which is configured to implement at least part of the present subject matter. It is to be noted that the apparatus 1070 shown in FIG. 8 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 3, 4, 5, 6 or 7.

For example, the processor 1071 is configured for: receiving a request from a user equipment to transmit calibration signals; allocating a set of resources for the transmission of the calibration signals; sending a message to the user equipment, the message indicating the set of resources; performing interference cancellation for detecting data signals received in accordance with the set of resources.

For example, the processor 1071 is configured for: sending a request to transmit calibration signals to a base station; receiving a message from the base station, the message indicating a set of non-reserved resources; transmitting calibration signals according to the set of resources.

The present subject matter may comprise the following clauses.

Clause 1. A user equipment comprising means being configured for: sending to an apparatus a first request message, the first request message indicating that the user equipment may transmit calibration signals; receiving from the apparatus a first response message, the first response message indicating a set of resources for transmission of the calibration signals; sending to the apparatus a second request message to activate the set of resources; receiving from the apparatus a second response message indicating activation of the set of resources; sending to the apparatus the calibration signals.

Clause 2. The user equipment of clause 1, the set of resources comprising a transmission duration, and a transmission bandwidth higher than a minimum bandwidth, the transmission duration being higher than a minimum number of orthogonal frequency-division multiplexing (OFDM) symbols.

Clause 3. The user equipment of clause 2, the first request message indicating the minimum bandwidth and the minimum number of OFDM symbols.

Clause 4. The user equipment of any of the preceding clauses 1 to 3, the set of resources comprising resources for Sounding Reference Signal (SRS) transmissions.

Clause 5. The user equipment of any of the preceding clauses 1 to 4, the second response message being received as downlink control information (DCI).

Clause 6. The user equipment of any of the preceding clauses 16 to 20, the first request message being a radio resource control (RRC) message or message conveyed through a physical random access channel (PRACH), the message comprising capability information of the user equipment.

Clause 7. The user equipment of any of the preceding clauses 1 to 6, the second request message being sent in any one of physical uplink channels physical uplink control channel (PUCCH) and physical uplink shared channel (PUSCH) according to further resources indicated in the first response message.

Clause 8. The user equipment of any of the preceding clauses 1 to 7, the first response message further indicates further resources for the transmission of the second request message by the user equipment.

Clause 9. The user equipment of any of the preceding clauses 1 to 8, the user equipment being configured to operate in a default mode of operation, the means being configured for switching into a calibration mode of operation in response to receiving the second response message, wherein in the calibration mode of operation the user equipment ignores default power control settings of the default mode of operation in order to transmit the calibration signals at a power equal to or higher than a power determined by the default power control settings.

Clause 10. The user equipment of any of the preceding clauses 1 to 9, the means being configured for extracting characteristics of a power amplifier of the user equipment using the transmitted calibration signals and using the characteristics for performing the calibration of the power amplifier.

As will be appreciated by person skilled in art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus comprising at least one processor; and at least one memory storing instructions that, when executed by at least one processor, cause the apparatus at least to:
receive a first request message from a user equipment, the first request message indicating that the user equipment may transmit calibration signals;
in response to receiving the first request message, configuring a set of resources for the transmission of the calibration signals;
send a first response message to the user equipment, the first response message indicating the set of resources;
receive a second request message from the user equipment to activate the set of resources;
in response to receiving the second request message, send a second response message indicating activation of the set of resources;
receive the calibration signals from the user equipment;
perform a cancellation of an interference caused by the calibration signals for detecting data signals received in accordance with the set of resources.

2. The apparatus of claim 1, wherein the instructions, when executed by the at least one processor, further cause the apparatus at least to:
schedule another user equipment in at least part of the set of resources; and
receive the data signals from the other user equipment.

3. The apparatus of claim 2, wherein the instructions, when executed by the at least one processor, further cause the apparatus at least to:
perform beamforming to obtain a maximum signal strength in a beam direction of a radiation pattern of an antenna array of the apparatus, wherein the beam direction is a direction of the other user equipment.

4. The apparatus of claim 1, wherein the set of resources comprising a transmission duration, and a transmission bandwidth higher than a minimum bandwidth, the transmission duration being higher than a minimum number of orthogonal frequency-division multiplexing (OFDM) symbols.

5. The apparatus of claim 4, wherein the first request message indicating the minimum bandwidth and the minimum number of OFDM symbols.

6. The apparatus of claim 1, wherein the set of resources comprising resources for Sounding Reference Signal (SRS) transmissions, and wherein the instructions, when executed by the at least one processor, further cause the apparatus at least to:
set a radio resource control parameter usage of the SRS resources, to a value indicating to the user equipment that the set of resources are for the calibration.

7. The apparatus of claim 1, wherein the second request message being received in any one of physical uplink channels physical uplink control channel and physical uplink shared channel according to further resources indicated in the first response message.

8. The apparatus of claim 1, wherein the instructions, when executed by the at least one processor, further cause the apparatus at least to:
configure further resources for the transmission of the second request message by the user equipment, wherein the first response message further indicates the further resources.

9. A method comprising:
receiving a first request message from a user equipment, the first request message indicating that the user equipment may transmit calibration signals;
in response to receiving the first request message, configuring a set of resources for the transmission of the calibration signals;
sending a first response message to the user equipment, the first response message indicating the set of resources;

receiving a second request message from the user equipment to activate the set of resources;
in response to receiving the second request message, sending a second response message indicating activation of the set of resources;
receiving the calibration signals from the user equipment;
performing a cancellation of an interference caused by the calibration signals for detecting data signals received in accordance with the set of resources.

10. The method of claim 9, wherein the user equipment being configured to operate in a default mode of operation, the method further comprising:
switching by the user equipment into a calibration mode of operation in response to receiving the second response message,
wherein in the calibration mode of operation the user equipment ignores default power control settings of the default mode of operation in order to transmit the calibration signals at a power equal to or higher than a power determined by the default power control settings.

11. The method of claim 9, further comprising:
extracting by the user equipment characteristics of a power amplifier of the user equipment using the transmitted calibration signals and using the characteristics for performing the calibration of the power amplifier.

12. A user equipment comprising at least one processor; and at least one memory storing instructions that, when executed by at least one processor, cause the user equipment at least to:
send to an apparatus a first request message, the first request message indicating that the user equipment may transmit calibration signals;
receive from the apparatus a first response message, the first response message indicating a set of resources for transmission of the calibration signals;
send to the apparatus a second request message to activate the set of resources;
receive from the apparatus a second response message indicating activation of the set of resources;
send to the apparatus the calibration signals.

13. The user equipment of claim 12, the set of resources comprising a transmission duration, and a transmission bandwidth higher than a minimum bandwidth, the transmission duration being higher than a minimum number of orthogonal frequency-division multiplexing (OFDM) symbols.

14. The user equipment of claim 12, wherein the first request message being a radio resource control message or message conveyed through a physical random access channel, the message comprising capability information of the user equipment.

15. The user equipment of claim 12, the second request message being sent in any one of physical uplink channels physical uplink control channel (PUCCH) and physical uplink shared channel (PUSCH) according to further resources indicated in the first response message.

16. The user equipment of claim 12, wherein the first response message further indicates further resources for the transmission of the second request message by the user equipment.

17. The user equipment of claim 12, wherein the user equipment configured to operate in a default mode of operation; and the at least one memory storing instructions that, when executed by the at least one processor, further cause the user equipment at least to:
switch into a calibration mode of operation in response to receive the second response message,
while in the calibration mode of operation, ignore default power control settings of the default mode of operation in order to transmit the calibration signals at a power equal to or higher than a power determined by the default power control settings.

18. The user equipment of claim 12, wherein the instructions, when executed by the at least one processor, further cause the user equipment at least to:
extract characteristics of a power amplifier of the user equipment using the transmitted calibration signals and using the characteristics for performing the calibration of the power amplifier.

* * * * *